(No Model.)
G. D. HAWORTH.
CHECK ROWER FOR CORN PLANTERS.
No. 351,176. Patented Oct. 19, 1886.
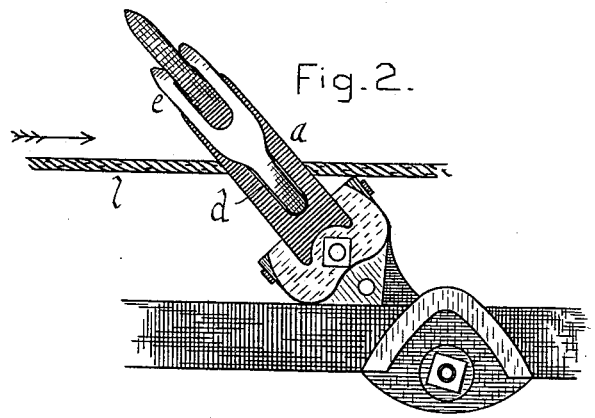
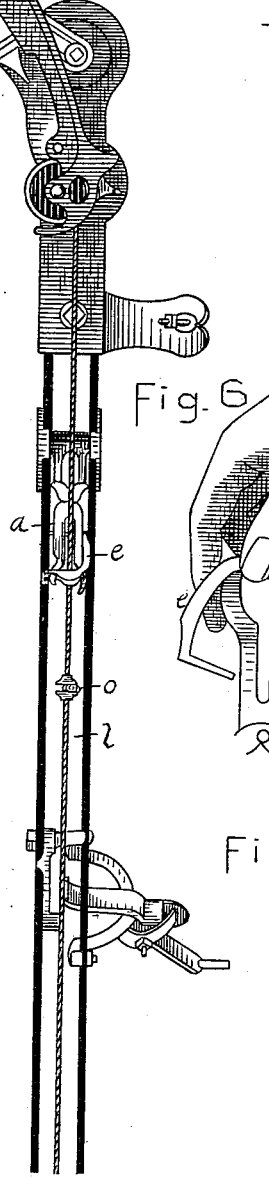
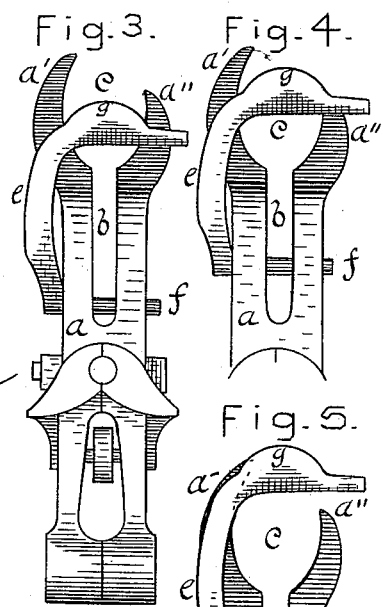
ATTEST.
W. L. Jones
C. C. Clark
INVENTOR
G. D. HAWORTH
By L. P. Graham
Atty.

UNITED STATES PATENT OFFICE.

GEORGE D. HAWORTH, OF DECATUR, ILLINOIS.

CHECK-ROWER FOR CORN-PLANTERS.

SPECIFICATION forming part of Letters Patent No. 351,176, dated October 19, 1886.

Application filed July 6, 1886. Serial No. 207,182. (No model.)

*To all whom it may concern:*

Be it known that I, GEORGE D. HAWORTH, of the city of Decatur, county of Macon, and State of Illinois, have invented certain new and useful Improvements in Check-Rowers for Corn-Planters, of which the following is a specification.

My invention relates to that class of check-rowers in which the resistance of knots on a line stretched across the field and anchored is used to actuate the seed-dropping mechanism of the planter; and my object is to prevent the line from becoming detached from the check-rower while in operation.

In the drawings accompanying and forming a part of this specification, Figure 1 is a plan of a portion of a check-rower embodying my invention. Figs. 2, 3, 4, 5, 6, and 7 are detail drawings of the mechanism used to prevent the check-row line from becoming detached from the check-rower during the operation of the same.

*a* represents a bifurcated lever adapted to be operated by the knots on a check-row line, and to indirectly impart the motion received therefrom to the seed-dropping mechanism of a corn-planter.

*a'* represents one of the forks of the lever, and *a''* represents the other fork, which is materially shortened.

*b* represents that portion of the bifurcation in lever *a* which is nearest its fulcrum, and which is wide enough to permit the free passage of the check-row line and sufficiently narrow to prevent the passage of the knots.

*c* represents the outer portion of the bifurcation in lever *a*, which is of a width sufficient to permit the passage of the knots on the line.

*d* is a transverse slot in lever *a*.

*e f g h i k* represent a dog for the lever, that prevents the detachment of the check-row line while the check-rower is in operation, *e* showing a bar provided with a longitudinal slot, *k*, *f* showing a guide-pin forming an approximate right angle with bar *e*, and *g* showing a dog projection cleft at *i*, rounded at *h*, and occupying a position approximately parallel with guide-pin *f*.

*l* represents the check-row.

*o* represents a stop, knot, or button on the check-row line, which stop, knot, or button may be formed and attached in any suitable manner.

In Fig. 2 the lever and dog are represented in side elevation. In Fig. 3 a face view of the same is given. Fig. 4 is a face view of the dog and a portion of the lever, showing the position of the dog while the knots on the line are passing through the lever. Fig. 5 is a face view of the dog and a portion of the lever, showing the dog in a position permitting the line to be connected with or disconnected from the lever. Fig. 6 indicates the manner in which the dog may be attached to and detached from the lever. Fig. 7 represents the dog in perspective.

In preparing for operation the dog is placed in position on the lever with the guide-pin extending through the slot of the lever, slot *k*, fitting over fork *a'*, and cleft *i*, embracing fork *a''*, and the line is placed in the bifurcation of the lever after raising the dog to the position indicated in Fig. 5. The force of gravity causes the dog to always rest in its lowest possible position, and the same force makes its connection with the lever practically permanent, as the point of suspension is within the bifurcation of the lever, and the bar *e* swings firmly against the side of the lever in its tendency to assume a position under its point of suspension. To detach the dog from the lever, it is only necessary to use the cleft *i* as a pivot, and with a swinging motion to carry the guide-pin and the slot *k* clear of the lever, this operation being reversed when the dog is to be attached. The dog rests in the position indicated in Fig. 3, effectually closing the widened portion of the bifurcation. The knots on the line strike the lever at the narrow portion of its bifurcation, carry it over on its pivot, and, sliding up to the dog, raise the same sufficiently to pass through the lever, leaving the dog to reassume its original position through force of gravity and the lever to be returned by any suitable means. The inclination of the lever toward the approaching knots and the rounded under surface of the dog effectually prevent the line from raising the dog until the lever is thrown, the dog and lever acting as an inclined plane, tending downward previous to the throw of the lever, and the lever acting as an inclined plane tending upward after said throw. By having one long and one short fork and extending the cleft end of the dog past the short fork, as shown, the line may be placed in the lever by a single motion, the operation consisting simply in catching the line under the cleft end of the dog and pulling the same upward and toward the lever until the dog assumes the position shown in Fig. 5 and admits the line.

I claim as new and desire to secure by Letters Patent—

1. In check-rowers, a bifurcate lever having the outer portion of its bifurcations widened, and a detachable dog extending across the outer end of the lever, as and for the purpose set forth.

2. In check-rowers, a bifurcate lever having the outer portion of its bifurcations widened, and a dog extending across the outer end of the lever and having a limited amount of motion longitudinally thereon, as and for the purpose set forth.

3. In check-rowers, a bifurcate lever having the outer portion of its bifurcations widened, and a dog extending across the outer end of the lever and having a limited amount of motion longitudinally thereon, that portion of the dog traversing the bifurcation being rounded at its under surface, as and for the purpose set forth.

4. In check-rowers, the combination of a bifurcate lever having the outer portion of its bifurcations widened, and provided with a longitudinal slot crossing the bifurcation, and a dog having a limited amount of motion in the slot and extending across the outer end of the lever, as and for the purpose set forth.

5. The combination, with the bifurcate lever $a$, having slot $d$, of a co-operating dog composed essentiailly of slotted bar $e$, guide-pin $f$, and projection $g$, having cleft $i$ and rounded surface $h$, as and for the purpose set forth.

6. In check-rowers, the combination of a bifurcate lever having the outer portion of its bifurcations widened and one fork shortened, and a dog extending across the bifurcation of the lever and having motion longitudinally on said lever to an extent sufficient to slightly pass the termination of the short fork, as and for the purpose set forth.

In testimony whereof I sign my name in the presence of two subscribing witnesses.

GEO. D. HAWORTH.

Attest:
THEODORE NELSON,
GEO. S. SIMPSON.